UNITED STATES PATENT OFFICE.

GEORG KORNDÖRFER AND BAPTIST REUTER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DERIVATIVES OF DIAMINODIOXYARSENOBENZENE AND PROCESS OF MAKING SAME.

1,053,300. Specification of Letters Patent. Patented Feb. 18, 1913.

No Drawing. Application filed April 20, 1912. Serial No. 692,061. REISSUED

*To all whom it may concern:*

Be it known that we, GEORG KORNDÖRFER, Ph. D., chemist, and BAPTIST REUTER, Ph. D., chemist, citizens of the Empire of Germany, residing at Höchst-on-the-Main, Germany, have invented certain new and useful Improvements in Derivatives of Diaminodioxyarsenobenzene and Processes of Making Same, of which the following is a specification.

We have made the observation that by adding a solution of formaldehydesulfoxylate of the formula: $CH_2O.NaHSO_2.2H_2O$ to solutions of diaminodioxyarsenobenzene, precipitates are produced which are readily soluble in alkalis. In fact for completely dissolving the precipitates there is only required so small an excess of alkali that the solutions can be regarded as being practically neutral. Such solutions retain the entire threapeutical efficiency of the pure diaminodioxyarsenobenzene, and owing to their neutral solubility they present in their therapeutical application considerable advantages over the solutions from the dihydrochlorid and the phenolate of diaminodioxyarsenobenzene. The quantity of the formaldehydesulfoxylate required for obtaining clear solutions may be varied within wide limits.

If a solution of diaminodioxyarsenobenzene prepared in the above indicated manner is precipitated by means of hydrochloric acid, precipitates result which possess the property of an acid. They readily dissolve in alkalis and ammonia, the solutions thus obtained showing a neutral reaction if an excess of alkali is avoided. The composition of these acids varies, dependent on whether the sulfoxylate has reacted upon the diaminodioxyarsenobenzene at ordinary temperatures or at 60–70° C. In the former case an acid is produced comprising only one acid group containing sulfur; in the latter case an acid comprising two such groups. The general formula of the new compounds is as follows:

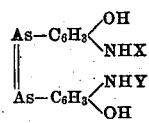

wherein "X" and "Y" stand for the residue known as methylene-sulfinic acid ($-CH_2SO_2H$), and "X" may be replaced by hydrogen. These acids form bright yellowish powders, difficultly soluble in water and insoluble in alcohol, ether, acetone and benzene. The corresponding alkali salts are obtained by dissolving these acids in the calculated quantity of caustic soda or potassium lye, aqueous ammonia or solutions of sodium or potassium carbonate, and precipitating the resulting solutions with alcohol or acetone or evaporating them to dryness in a vacuum. The solid alkali salts also form yellowish powders, readily soluble in water.

Example I: 25 grams of dihydrochlorid of diaminodioxyarsenobenzene are dissolved in 250 grams of water and to this solution are added by drops, with stirring, 12.5 grams of formaldehydesulfoxylate dissolved in 125 grams of water. After one hour 80 ccms. of a 10% solution of sodium carbonate is added, whereby a clear yellow solution is obtained which can be further diluted as desired and which remains clear when kept.

Example II: 25 grams of dihydrochlorid of diaminodioxyarsenobenzene are dissolved in 250 grams of water, and there are then added, with stirring, a solution of 25 grams of formaldehydesulfoxylate in 250 grams of water and after one hour 80 ccms. of a 10% solution of sodium carbonate. To the clear solution thus obtained are added 100 ccms. of hydrochloric acid of 12% strength. The precipitated acid is filtered off, washed and dried *in vacuo*; it comprises only one acid-group containing sulfur. The formula of this new compound is:

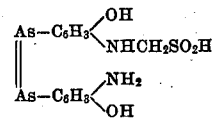

Example III: For transforming the acid obtained under Example II into its sodium salt, 20 grams of the acid are suspended in 70–80 grams of water, this suspension is dissolved by adding 20 ccms. of twice normal caustic soda lye, and the resulting solution is poured in a thin stream into 1000 ccms. of alcohol. The precipitate is filtered off, washed with alcohol and dried *in vacuo*. The salt contains only one atom of sodium.

Example IV: There is added to a finely-divided aqueous suspension of 21 grams of the base of diaminodioxyarsenobenzene, a solution of 25 grams of formaldehydesulfoxylate in 60 grams of water, and this mixture is gently heated on the water-bath until it is completely dissolved. The solution is precipitated by 25 ccms. of concentrated hydrochloric acid, and the precipitated acid is further treated as indicated in Examples II and III. The acid thus obtained contains two acid groups containing sulfur and its sodium salt two atoms of sodium.

Example V: 50 parts by weight of hydrochlorid of diaminodioxyarsenobenzene are dissolved in 200 parts of glycol and to this solution is added another solution of 31 parts of formaldehydesulfoxylate in 50 parts of water. After stirring for 5 minutes, a solution of sodium carbonate is added until the solution shows a neutral reaction. Thus results a solution of diaminodioxyarsenobenzene of neutral reaction and ready for use, which can be diluted with water in any desired proportion without the solution becoming turbid. If this solution is run into large quantities of ethyl alcohol or a mixture of ethyl alcohol and ether, or acetone, a yellowish precipitate forms, which is also readily soluble in water with neutral reaction. In the place of the glycol, in this example, other alcohols may be used as solvents, for instance methyl alcohol, ethyl alcohol, glycerin or the like.

Having now described our invention, what we claim is:

1. The process of manufacturing new derivatives of diaminodioxyarsenobenzene, which consists in reacting on diaminodioxarsenobenzene with formaldehydesulfoxylate.

2. As new products, the derivatives of diaminodioxyarsenobenzene the radicals of which have the general formula:

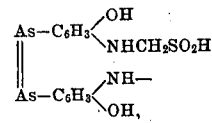

said derivatives being yellowish powders, difficultly soluble in water, insoluble in alcohol, ether and acetone, dissolving in alkalis with formation of salts, these alkali-salts being yellowish powders readily soluble in water.

3. As a new product, the derivative of the diaminodioxyarsenobenzene having the formula:

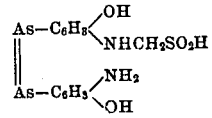

being a yellowish powder, difficultly soluble in water, insoluble in alcohol, ether and acetone and dissolving in alkalis with formation of a salt constituting, in the form of the sodium salt obtained with an equivalent of caustic soda, a yellowish powder readily soluble in water with neutral reaction.

In testimony whereof, we affix our signatures in presence of two witnesses.

GEORG KORNDÖRFER.
BAPTIST REUTER.

Witnesses:
JEAN GRUND,
CARL GRUND.